United States Patent [19]

Osborn

[11] Patent Number: 4,536,002

[45] Date of Patent: Aug. 20, 1985

[54] GAUGE WHEEL APPARATUS FOR A BANDING SPRAYER

[76] Inventor: Harley G. Osborn, Zearing, Iowa 50278

[21] Appl. No.: 539,490

[22] Filed: Oct. 6, 1983

[51] Int. Cl.³ .............................................. B62D 61/12
[52] U.S. Cl. .................... 280/43.18; 280/43.2
[58] Field of Search ................. 280/43.2, 43.23, 43.24, 280/43.18, 701

[56] References Cited

U.S. PATENT DOCUMENTS

| | | | |
|---|---|---|---|
| 2,774,612 | 12/1956 | Evans | 280/43.18 |
| 2,781,529 | 2/1957 | Moody | 280/43.18 |
| 3,435,599 | 4/1969 | Engler | 280/43.2 |
| 3,543,864 | 12/1970 | Wenzel | 280/43.23 |
| 3,642,300 | 2/1972 | Klopp | 280/43.23 |
| 4,178,005 | 12/1979 | Kent | 280/43.18 |

FOREIGN PATENT DOCUMENTS 2807518  8/1979  Fed. Rep. of Germany ... 280/43.23

OTHER PUBLICATIONS

Walsh Wheel Assembly with Marker.

*Primary Examiner*—Joseph F. Peters, Jr.
*Assistant Examiner*—Everett G. Diedriks, Jr.
*Attorney, Agent, or Firm*—Henderson & Sturm

[57] ABSTRACT

A gauge wheel apparatus for attachment to the ends of agricultural folding tool bars for a banding sprayer, or the like, which permits the level of the tool bar to be adjusted to maintain the ends of a tool bar in a desired position above the ground, while at the same time absorbing the shock of uneven ground encountered by such gauge wheel so that the tool bar remains in substantially the same place above the ground despite such irregularities in the surface of the ground.

1 Claim, 6 Drawing Figures

U.S. Patent  Aug. 20, 1985  4,536,002
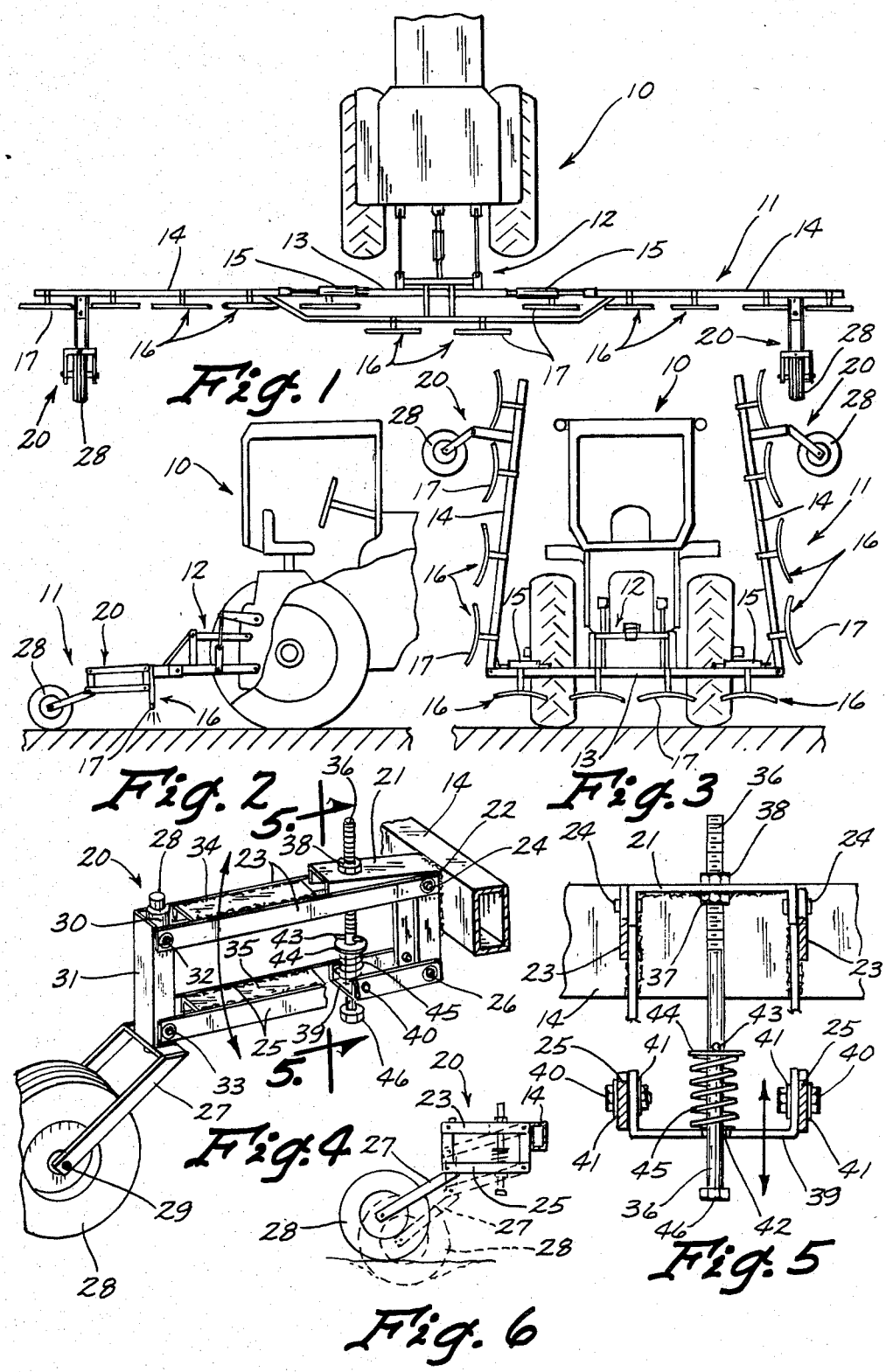

4,536,002

GAUGE WHEEL APPARATUS FOR A BANDING SPRAYER

TECHNICAL FIELD

The present invention relates generally to agricultural spraying devices and more particularly to an adjustable shock absorbing gauge wheel apparatus for a tool bar having sprayer attachments connected thereto.

BACKGROUND ART

Modern banding sprayers are used to spray a band of herbicide directly onto rows of crops for the purpose of killing weeds or, in the case of a soybean crop, for killing volunteer corn in such rows as well as weeds. Obviously, a herbicide is used which does not kill the crop itself. Typically, the weeds between the rows are killed by the cultivating process. It is of course well-known that elimination of weeds will increase the yield for such crops.

In modern farming, tractors have become larger than they were a decade or two ago and consequently it is typical to treat more of the crop at once then was done heretofore. Consequently, it has become a common practice for several years to utilize tool bars which fold for transportation through gates and along roads and highways, and which then fold out when in the fields to encompass a wide path covering many rows.

While the advantages of such folding tool bars are obvious, there are some disadvantages as well. For example, it is difficult to maintain the tool bars at the outer extremities in the proper position at all times. For example, the ends of the tool bars in prior art tend to flop up and down and have excessive vibration therein, and this results in an uneven spraying of the crops. Uneven spraying results in wasted herbicide and row crops which have not had the weeds eliminated therein. Consequently, there exists a need for structures which will overcome the aforementioned problems.

DISCLOSURE OF THE INVENTION

The present invention relates to a gauge wheel apparatus for attachment to the ends of folding tool bars for a banding sprayer, or the like, which permits the level of the tool bar to be adjusted to maintain the ends of a tool bar in a desired position above the ground, while at the same time absorbing the shock of uneven ground encountered by such gauge wheel so that the tool bar remains in substantially the same place above the ground despite such irregularities in the surface of the ground.

An object of the present invention is to provide an improved gauge wheel structure which is easily adjustable and has shock absorbing features.

Another object of the invention is to provide a gauge wheel structure of the type mentioned above which is economical to produce and dependable to use.

Other objects, advantages and novel features of the present invention will become apparent from the following description of the invention when considered in conjunction with the accompanying drawings.

BRIEF DESCRIPTION OF THE DRAWINGS

FIG. 1 shows a top plan view of a banding sprayer utilizing the present invention;

FIG. 2 is a side elevational view of the present invention as used and as depicted in FIG. 1;

FIG. 3 is a rear view of the present invention, showing the tool bar in a folded transport position;

FIG. 4 is an enlarged perspective view of the improved gauge wheel structure of the present invention;

FIG. 5 is an enlarged cross-section view taken along line 5—5 of FIG. 4; and

FIG. 6 is a view of the device shown in FIG. 4 and illustrating that the tool bar is maintained in substantially the same position despite small irregularities in the surface of the ground.

BEST MODE FOR CARRYING OUT THE INVENTION

Referring now to the drawings wherein like reference numerals designate identical or corresponding parts throughout the several views, FIG. 1 shows an agricultural tractor (10) having a banding sprayer (11) attached thereto through a conventional three-point hitch (12). The banding sprayer (11) includes a center tool bar portion (13) and end tool bar portions (14) which are selectively folded between the position shown in FIGS. 1 and 2 and the position shown in FIG. 3 by means of hydraulic cylinders (15) which are attached to central tool bar (13) and pivotally attached, through a linkage, to end tool bar section (14). A plurality of straps (16), having a plurality of nozzles (17) thereon, are selectively mounted in a well-known fashion at spaced intervals along the length of the tool bars (13) and (14) and when such sprayer is in use, for example as shown in FIGS. 1 and 2, a herbicide is sprayed out through the nozzle (17) and onto the rows of crops for the reasons which were discussed above.

In order to overcome problems detailed above with respect to positioning the ends of the tool bars (14) and preventing them from bouncing up and down, the apparatus (20) shown in FIGS. 4–6 is utilized.

Referring to FIGS. 5 and 6, it is noted that the tool bar section (14) has an L-shaped member (21) rigidly attached thereto, such as by a weld (22). An upper link member (23) is pivotally attached to the L-shaped member (21) along a horizontal axis at the pivot (24), and a lower link member (25) is pivotally attached at one end thereof also to the L-shaped member (21) at the pivot pin (26). A yoke (27) has a gauge wheel (28) rotatably attached thereto at an axle (29), as can readily be seen in FIG. 4. The yoke (27) has an upstanding cylindrical post (48) rigidly attached thereto and this upstanding rigid post (48) is pivotally attached to a journal portion (30), such journal (30) having a housing (31). The upper link member (23) is pivotally attached to the member (31) at the pin (32), and the lower link member (25) is pivotally attached to the journal housing (31) at the pin (33). The upper link (23) is constructed of a pair of bars and has an intermediate reinforcement member (34) welded thereto for strength. Similarly, the lower link member (25) has a member (35) welded therein for strength purposes.

Referring now to FIG. 5, it is noted that a threaded rod (36) extends through the top portion of the L-shaped member (21) and is threadably engaged with a threaded nut (37), which threaded nut (37) is welded to the lower side of the L-shaped member (21) as can best be seen in FIG. 5. A lock nut (38) is positioned on top of the L-shaped member (21) for holding the rod (36) in place, except when it is desired to move it. A pivot member (39) is pivotally attached to the lower link member (25) by means of nut and bolt assemblies (40). These nut and bolt assemblies (40) have washers (41) on each side thereof for permitting rotation of the pivot member (39) with respect to the link members (25).

It will also be readily noted in FIGS. 4 and 5 that the threaded rod (36) extends up through an opening (42) in pivot member (39) for sliding movement. A roll pin 43 extends through a hole in the rod (36) and a washer (44) is prevented from moving upwardly because of the roll pin (43). A compression spring (45) is disposed between the washer (44) and pivot member (37) whereby the parallelogram structure, including the elements (21) and (31) and the top and bottom link members (23) and (25) is biased downwardly from the tool bar (14) and L-shaped member (21).

In operation, when it is desired to adjust the gauge wheel (28) to hold the outer ends of the tool bar (14) in a proper position, the cylinders (15) would be utilized to the banding sprayer structure from the position shown in FIG. 3 to the position shown in FIGS. 1 and 2. Once this has been accomplished, then the lock nut (38) shown in FIGS. 4 and 5 would be loosened and the large end (46) of the rod (36) would be rotated in whatever direction would be required for pushing the tool bar (14) upwardly or pulling the tool bar (14) downwardly when such gauge wheel (28) is on the ground. After this adjustment has been made, then lock nut (38) is tightened down again against the L-shaped member (21) for preventing rotation of the rod (36) which would effect the vertical adjustment of the tool bar (14) with respect to the ground. The spring (45) and its associate structure automatically provides the shock absorption needed for substantially holding tool bar (14) in a steady position, despite irregularities in the ground; for example, as shown in FIG. 6 showing the gauge wheel (28) on a level place in solid lines and in a depression in dashed lines.

Obviously, many modifications and variations of the present invention are possible in light of the above teachings. It is therefore to be understood that, within the scope of the appended claims, the invention may be practiced otherwise than as specifically described.

I claim:

1. A shock absorbing gauge wheel apparatus for attachment to a tool bar having spraying equipment attached thereto, said apparatus comprising:
   an L-shaped member rigidly attached to said tool bar;
   a yoke;
   a gauge wheel;
   a yoke means for rotatably mounting said gauge wheel along a horizontal axis to said yoke;
   journal means for pivotally mounting said yoke along a vertical axis;
   an upper link member;
   means for pivotally connecting said upper link member at one end thereof, along a horizontal axis, to said L-shaped member;
   means for pivotally connecting the other end of said upper link member, along a horizontal axis, to said journal means;
   a lower link member;
   means for pivotally connecting said lower link member at one end thereof, along a horizontal axis, to said L-shaped member;
   means for pivotally connecting said lower link member at the other end theroef, along a horizontal axis, to said journal means;
   a rod;
   adjustable means for rigidly attaching said rod to said L-shaped member, said adjustable means comprising threads on said rod and threaded means rigidly attached to said L-shaped member whereby rotation of said rod moves said rod upwardly or downwardly with respect to said L-shaped member and lock nut means on the threads of said rod for selectively preventing or allowing said rod to rotate with respect to said L-shaped member;
   pivot means for pivotally attaching said rod to the lower link member; and
   shock absorbing biasing means attached to said rod for biasing said link means downwardly and absorbing shock when said wheel hits a bump, said biasing means being a compression spring in abutment on one end thereof with said pivot means, said compression spring being in operative abutment on the other end thereof to a pin extending through said rod.

* * * * *